United States Patent [19]

Wilson et al.

[11] 4,081,784
[45] Mar. 28, 1978

[54] OMNIDIRECTIONAL MONITOR BUOY

[75] Inventors: Wayne D. Wilson, Silver Spring; Arthur D. Delagrange, Sykesville, both of Md.

[73] Assignee: The United States of America as represented by the Secretary of the Navy, Washington, D.C.

[21] Appl. No.: 728,814

[22] Filed: Oct. 1, 1976

[51] Int. Cl.$^2$ ............................. G01S 9/66; H04R 1/34
[52] U.S. Cl. ..................................... 340/3 D; 340/8 R; 340/10
[58] Field of Search .................... 340/3 D, 8 FT, 8 R, 340/10, 11

[56] References Cited

U.S. PATENT DOCUMENTS

| | | | |
|---|---|---|---|
| 3,051,927 | 8/1962 | Mazzagatti | 340/10 |
| 3,068,446 | 12/1962 | Ehrlich et al. | 340/10 |

*Primary Examiner*—Richard A. Farley
*Attorney, Agent, or Firm*—R. S. Sciascia; A. L. Branning; R. E. Bushnell

[57] ABSTRACT

An underwater intrusion alarm system using an array of one or more remotely deployable, acoustic doppler detector probes. Each probe is a unitary submersible buoy formed by a pair of vertically coaxially and acoustically isolated, right cylindrical active transducer elements that are shielded from surface and bottom reflections. Transmitter and receiver circuits may be located either in the buoy with an external connection to conveniently located headphones and alarms or at a distant site with a fixed wire connection to the buoy transducer elements. A depth sensitive ancilliary mechanism regulates the submergence of the buoy in conformance with the rise and fall of the tide.

31 Claims, 17 Drawing Figures

OMNIDIRECTIONAL MONITOR BUOY

BACKGROUND OF THE INVENTION

This invention relates to the art of intrusion monitoring and more particularly to underwater echo detection of objects propelled with a patterned cadence (e.g., a human swimmer).

Prior underwater intrusion monitoring apparatus reply upon detection and analysis of variations in the received echoes of a continuous-wave signal transmitted by either scanning or rotating a narrow beam width signal through the volume to be monitored. Although a narrow beam signal has a higher signal-to-noise ratio than a wide beam signal, in order to monitor the same volume of water as a wide beam device, a narrow beam device must rely upon a longer beam length. A strong thermal gradient causes the upper surface of a beam to bend away from the surface of the water, an effect that becomes more pronounced with the beam length. The thermal gradient effect means that an effective beam of limited length is obtainable during the afternoon hours on a warm day while an effective beam of significantly greater length is obtainable with the same device during the cooler night hours on the same day. It is therefore apparent that although deployed prior art devices provide an adequate monitoring of a volume of water during the nighttime hours, they are unable to monitor the more distant majority of that volume during the afternoon hours due to bending of the upper edge of the beam lobe, thus leaving a significant gap in the monitored volume in which the relatively quiet propulsive movements of a submerged intruder during the traditional hours of peak surface activity (e.g., small vessels entering or departing a harbor as well as the less frequent movements of larger vessels) are unnoticeable. Additionally, their dependency upon electrically switched scanning or mechanical rotation subjects a prior art intrusion monitoring device to an increased risk or failure due to the inherent weakness of its mode of operation.

SUMMARY OF THE INVENTION

The present invention surmounts the disadvantages and limitations of the prior art by providing in a submersible buoy a static unitary acoustic doppler intrusion sensor having an omnidirectional horizontal beam. The buoy is constructed with coaxial transducer transmitting and receiving assemblies vertically separated at opposite extremities. Each assembly is substantially identical (e.g., interchangeable) having a right circular cylindrical active transducer element fabricated from a piezoelectric material each respectively coupled to the transmitting and receiving circuits. Rubber laminae of a greater diameter made of a material having a sound absorbent quality at the frequencies of operation are centered on the bases of each transducer to provide a vertical beam having an 8° (i.e., at 3 decibels down from the peak) profile by greatly attenuating the sidelobes. Electrically conducting discs are sandwiched between opposite surfaces of the sound absorbent rubber layers in order to reduce the influence of local electrical currents circulating between the transducer transmitting and receiving assemblies as well as extraneous electrical currents and electro-magnetic fields upon the transducer elements.

Accordingly, it is one object of the present invention to provide an underwater intrusion monitor.

It is another object of the present invention to provide a unitary transducer assembly for an underwater intrusion monitor.

It is another object of the present invention to provide a static (i.e., no moving parts) transducer assembly for an underwater intrusion monitor.

It is also an object of the present invention to provide an horizontally omnidirectional underwater intrusion monitor.

It is yet another object of the present invention to provide an horizontally omnidirectional transducer assembly for an underwater intrusion monitor.

It is still yet another object of the present invention to provide an easily deployable underwater intrusion monitor which can be deployed singly, or in multiples to provide wider area coverage.

It is a further object of the present invention to provide a remotely deployable underwater intrusion monitor.

It is a still further object of the present invention to provide an easily deployable underwater intrusion monitor adaptable for unattended operation.

It is a yet further object of the present invention to provide an underwater intrusion monitor having a range of coverage conforming to the limitations of range placed upon ultrasonic frequencies by the medium of propagation.

It is a still yet further object of the present invention to provide an underwater transducer assembly quickly deployable in multiples with associated transmitting or receiving circuitry for mounting an intruder detection barrier conforming to the outline of a stationary object.

BRIEF DESCRIPTION OF THE DRAWINGS

A more complete appreciation of this invention and many of the attendant advantages thereof will be readily appreciated as the same becomes better understood by reference to the following detailed description when considered in conjunction with the accompanying drawings in which like numbers indicate the same or similar components, wherein.

DETAILED DISCUSSION OF THE EMBODIMENTS

Prior efforts at underwater intrusion monitoring have been directed to obtaining long detection ranges in order to minimize the number of platforms (e.g., small launches) required to deploy the intrusion detectors, to minimize the manpower required to operate the systems, and to take advantage of the heightened signal to noise ratio concomitant with narrow beam width. Improvements in the prior art are directed to narrowing the beam width in order to reduce the susceptibility of the system to false alarms by diminishing the volume of water insonified at any instant.

Figure 1:
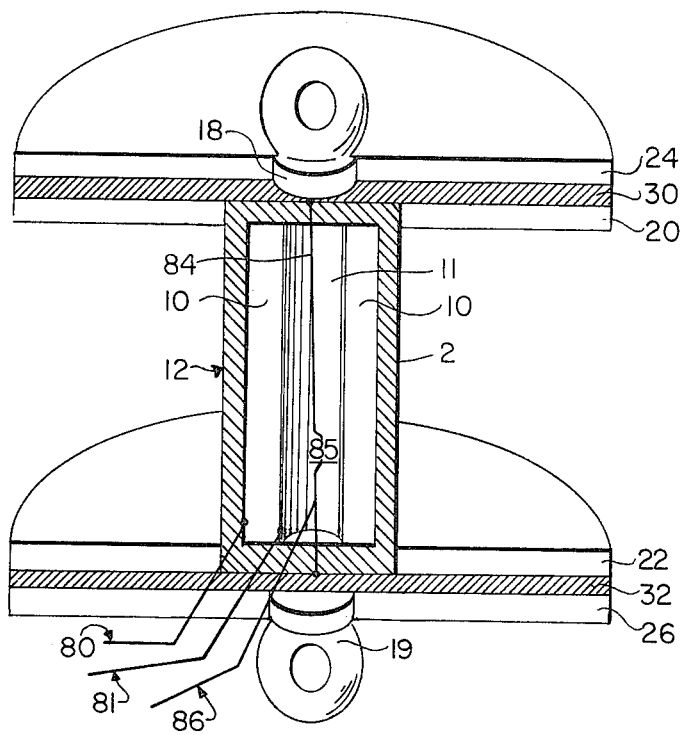
FIG. 1 is a perspective section of a transducer assembly constructed according to the present invention.

Referring now to FIG. 1 of the drawings where there is shown a cross-section perspective view of a single transducer assembly 2, a hollow right cylindrical transducer element 10 of an active piezoelectric material (e.g., an alloy such as barium-zirconiumtitanium) is encased by a potting compound 12. Air pocket 11 may be either empty or filled with the potting compound 12. The inner and outer surfaces of cylinder 10 are coated with silver. In one embodiment, transducer element 10 had a height of a few centimeters. A pair of electrically conductive discs (e.g., aluminum) 30, 32 are coaxially centered upon both bases of the encased transducer element 10. Electrical leads 84, 85 electrically couple discs 30, 32 to a distant ground potential. When two transducer assemblies 2 are arranged in a submerged buoy as an underwater intrusion monitor, a small electrical current will circulate between the transducer element 2, causing detectable noise. Additionally, extraneous electrical currents from local sources (e.g., submerged power cable, generators operating in the vicinity, or ground wires of transmitter towers) increase the amplitude of the noise. Grounded electrically conductive plates 30, 32 extend beyond the surface of element 10 to the edge of the primary lobe of the beam pattern and thereby attenuate the noise these electrical currents cause by electrically shading transducer element 10 as they offer a path of lower resistance to the extraneous currents. Grounds plates 30, 32 may be fabricated from any electrically conductive material. Inner opposite surfaces of grounding plates 30, 32 are coated with layers of a material 20, 22 respectively, that is sound absorbent at the frequencies on which assembly 2 operate (e.g., butyl rubber). The outer perimeter of the sound absorbent layers 20, 22 should extend to the edge of the primary lobe of the beam pattern of the assembly 2 in order to suppress the side lobes. As the influence of the sound absorbent layers 20, 22 upon acoustic signals is not completely understood, it is not known whether these layers absorb and thereby attenuate the side lobes, or whether the layers merely redirect the side lobes into the primary lobe of the signal. The outer surfaces of grounding plates 30, 32 are also coated with layers 24, 26 of a sound absorbent material in order to attenuate signal reflections from the nearest areas of the sea surface and bottom, respectively. These laminae outer layers 24, 26 may also serve as shock bumpers to protect the assembly from abusive handling. Eyes 18, 19 are coaxially affixed to the top and bottom planes of assembly 2 in order that it may be secured to an anchor, buoy or float in a selected position relative to a second assembly 2 during operation.

Figure 2:
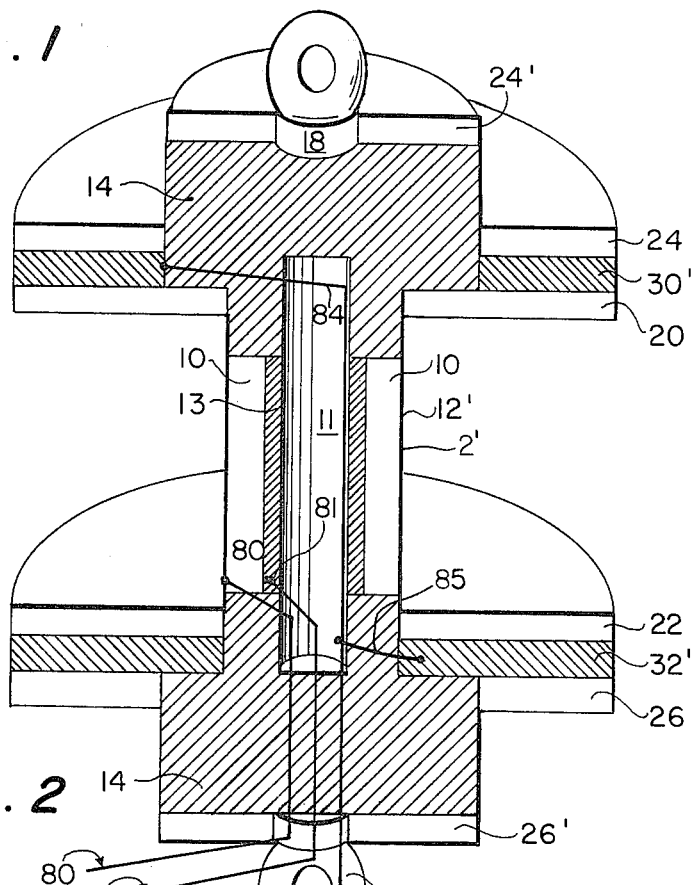
FIG. 2 is a perspective section of an alternative embodiment of a transducer assembly constructed according to the present invention.

Referring now to FIG. 2, an alternative embodiment of a transducer assembly 2' is shown. The active transducer element 10 is a commercially available piezoelectric cylinder (e.g., bariumzirconium-titanate) with the inner and outer cylinders silvered. Several sizes were tried. The overall surface area of the element 10 is choosen to achieve a compromise between sensitivity and impedance. The height of element 10 is choosen to correspond to the vertical beam width, while the wall thickness is choosen to provide resonance at the carrier frequency. Transducer element 10 is attached with an epoxy type adhesive to an electrically insulating rod (e.g., phenolic) 13 and end caps 14 are attached. The exposed outer surface of transducer element 10 is coated with a silicone base mold release compound and covered by a heat-shrinkable tubing 12', an easily applied, inexpensive, and to a certain extent damage repairable, protection against a sea water environment. Wide diameter grounding plates 30', 32', discs of an electrically conductive material (e.g., aluminum, brass) are coaxially centered upon opposite bases of transducer element 10 to shade the covered outer surface of element 10 by offering a path of lower resistance to extraneous aquatic electrical currents. Plates 30', 32' are electrically coupled via leads 84, 85 and are grounded (to a chassis or earth ground) via lead 86 to a distant contact. In practice, the inventors have found it to be convenient to run the ground lead 86 along with the other leads (e.g., headphone, alarm, power) connected to the assemblies 2 to the distant location of the human operator. The inner and outer surfaces of discs 30', 32' are coated with laminae layers of a material, 20, 24, 22, 26 respectively, that is sound absorbent at the frequencies on which assembly 2 operates. Similarly, the exposed surfaces of end caps 14 are covered with layers 24' of the same sound absorbing material. Electrical leads 80, 81 are coupled to opposite surfaces of transducer element 10. The outer lead 80 is coupled to the signal ground, while the inner lead 81 is a signal lead coupled to the corresponding transmitter or receiver circuitry. Eye rings 18, 19 are coaxially affixed to the top and bottom bases of assembly 2 to provide convenient points of securing the assembly during its deployment.

Figures 3, 4, 5:
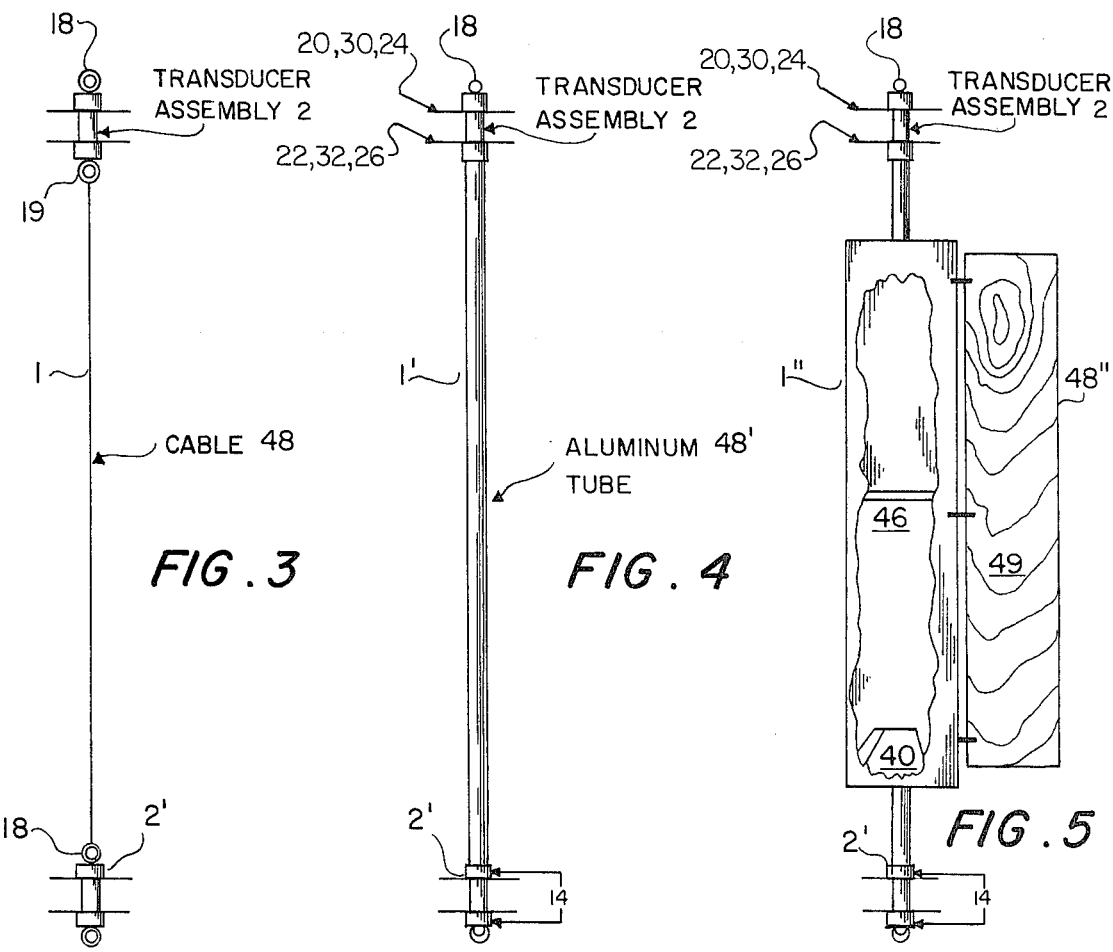
FIG. 3 is a profile view of a pair of transducer assemblies arranged in an operating position as a submerged buoy.
FIG. 4 is a profile view of a pair of transducer assemblies arranged in an alternative operating position as a submerged buoy.
FIG. 5 is a profile view of a pair of transducer assemblies held apart by an intermediate float.

During operation a pair of assemblies 2, 2' one serving as a transmitting element while the other serves as a receiving element, are deployed in a selected arrangement. Referring now to FIG. 3 of the drawings, where a typical arrangement of a receiver and a transmitter transducer assembly 2, 2' to form a monitor buoy 1 is shown. Upper assembly 2 is suspended by its upper eye ring 18 from a convenient support (e.g., float 70 shown in FIG. 6, or the side of a floating vessel). Lower assembly 2' is suspended from its upper eye ring 18 by an intermediate member 48, here a length of cable, from the lower ring eye 19 of assembly 2. FIG. 4 shows an alternate arrangement of the monitor buoy 1' with an aluminum tube serving as the intermediate member 48' coupling assemblies 2, 2'. The intermediate member 48 serves primarily as a tensile component for maintaining a fixed vertical coaxial separation between the assemblies at either ends of the monitor buoy. Depending upon the requirements of buoyancy, stability, or compaction of monitor buoy 1, the shape of member 48 may be varied from merely a length of cable to a hollow gas filled tube, to a compartmentalized and weighted float of adequate volume to house the transmitter and receiver circuits as well as the necessary source of energy. In the latter instance, referring now to FIG. 5, an alternative embodiment of a monitor buoy 1'', intermediate member 48'' is a gas filled float. A weight 40 is attached to the inner surface of the lower base of member 48'' to force the buoy into a vertical or upright position while deployed in an aquatic environment. A bulkhead 46 divides the interior volume of member 48'' into two compartments, each suitable for housing the corresponding transmitter or receiver circuitry and the associated energy sources (not shown). With these associated circuits contained in intermediate member 48'', only low frequency electrical connections between buoy 1'' and the monitor operator are required. Buoy 1'' may be anchored by a single or multiple gimbal collar attached around the circumference of member 48'' at the center (e.g., perhaps at the geometric center of a symmetric buoy), of buoy 1'' to prevent the water's current from tipping the buoy from its desired vertical position. A single fin 49 constructed of a substantially flat material, (e.g., a rectangular section of plywood) may be attached along the exterior length of member 48'' to form a vertical plane. Fin 49 acts as a vane by turning the buoy with the sea current (e.g., a tidal flow), thereby further stabilizing the vertical alignment of assemblies 2, 2' in fast flowing currents by preventing eddies from forming downstream of the buoy. Such eddies would cause the buoy to wobble.

Figure 6:
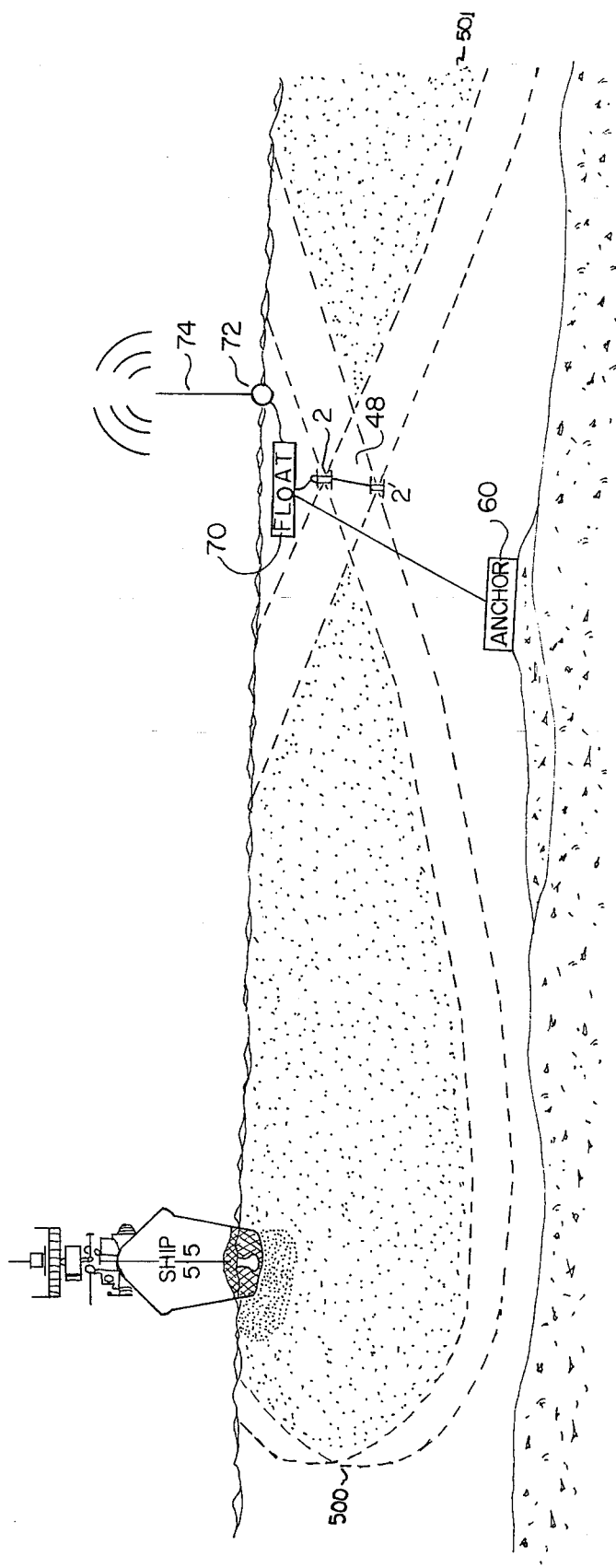
FIG. 6 is a simplified scenic cross section illustrating one deployment of a submerged intrusion monitor and the outline of its beam patterns according to the present invention.

Referring now to FIG. 6 of the drawings, there is shown a scenic cross-section of a monitor buoy of the type shown in FIGS. 3 and 4 deployed from a surface vessel 55. An intermediate member 48 positions transducer assemblies 2, 2' in a spaced apart, coaxial arrangement. The lower assembly 2' is hung from the upper assembly 2, which is in turn hung below a float 70. An anchor 60 lying on the sea bottom confines the movement of submerged float 70. The transmitter and receiver circuits, as well as an energy source may be carried in float 70. A second float 72 holds a vertical whip antenna on the surface, thereby providing a radio link between the remotely deployed monitor buoy 1 and a distant operator.

Transmitter transducer assembly 2' projects a beam (shown foreshortened in FIG. 6) of ultrasonic energy into the surrounding water. Similarly, receiving transducer assembly 2 is responsive to the energy projected by transmitter assembly 2' as detected by receiver assembly 2. An intruder such as a human being swimming underwater, entering the volume of water within the beam of both the transmitter and receiver transducer assemblies 2', 2 causes rhythmic pressure variation detectable by receiver assembly 2. The right circular cylindrical shape of the transducer elements 10, in combination with the effect of the sound absorbent material coating the grounding plates, produces a narrow vertical (e.g., one embodiment has an eight degree vertical beam at three decibels down from the beam peak) and a omnidirectional horizontal beam pattern of the individual assemblies 2, 2'. The spaced-apart, vertical coaxial arrangement of the transmitter assembly 2' with respect to the receiver transducer assembly 2 produces the distant overlapping of the projected and the detected beams of the transmitter and receiver assemblies respectively, and the concominant distant sensitivity (i.e., lower or least sensivity in its near environment) of the monitor buoy.

The acoustic signals received by receiving transducer assembly 2 consist of doppler signals from a target and background noise such as pick-up between transducers and the dopper returns from natural environment conditions such as water current, turbulence, surface wave action, and fixed objects such as a river bottom, pilings etc. Although the background noise doppler returns vary in time with changing current and wind conditions, they appear to be of constant amplitude over a period of several seconds. In contrast to these relatively constant environmental signals, a swimmer produces a repeated signal that varies rapidly in amplitude as he kicks his feet or moves his arms to propel himself through the water.

Figure 8:
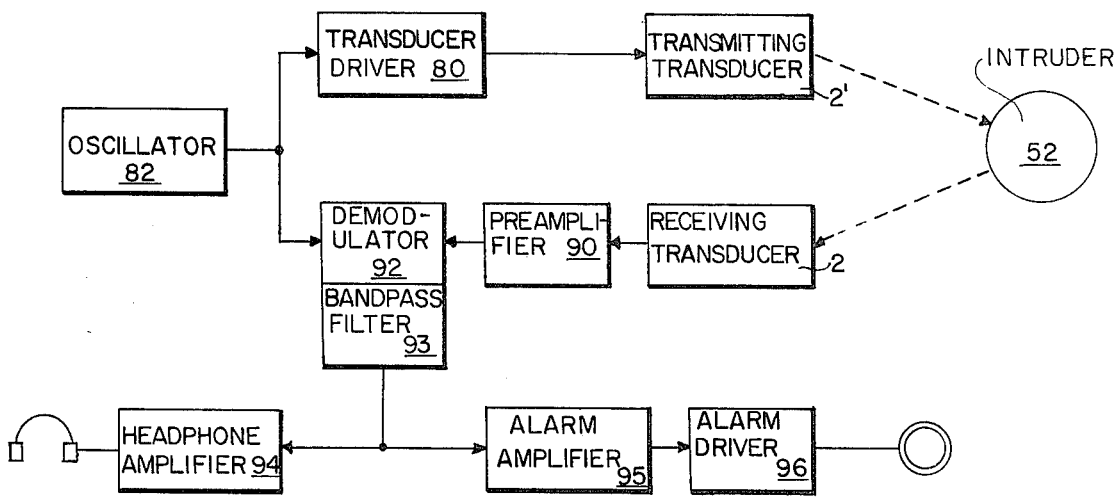
FIG. 8 is a block diagram of the transmitting and receiving circuits associated with the intrusion monitor buoy of the present invention.
Figure 11:
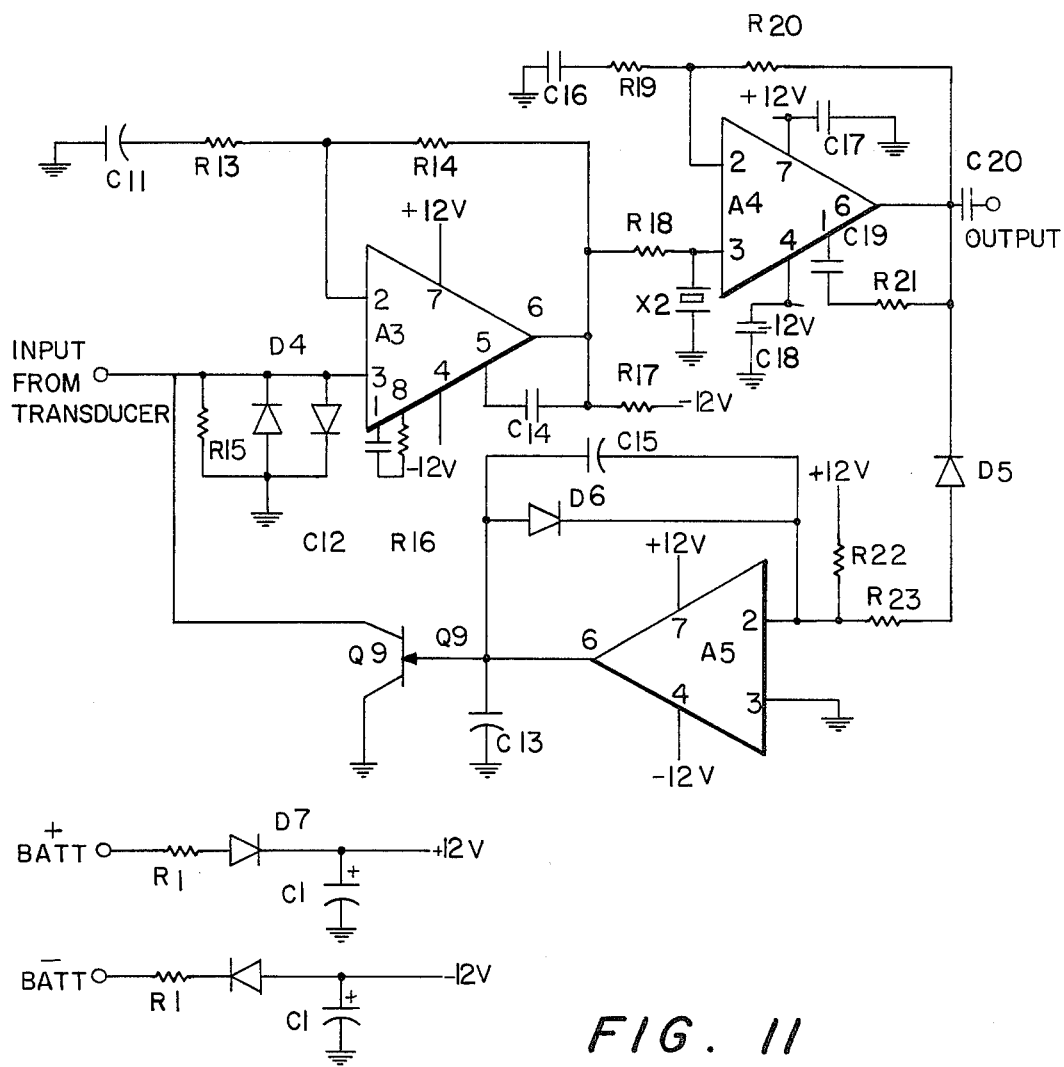
FIG. 11 is a schematic diagram showing a preamplifier circuit.

All of the received acoustic signals are converted into electrical signals by receiving transducer assembly 2 and fed to an automatic gain controlled (AGC), non-saturating preamplifier 90, described more fully hereinafter with reference to FIGS. 8 and 11, which does not affect those signals that change rapidly relative to the time constant of AGC preamplifier 90, such as signals produced by an underwater swimmer. Signals that are constant in amplitude or signals that vary slowly relative to the AGC time constant are normalized by AGC preamplifier 90.

Each transducer assembly 2, 2' lies at the focus of a frustotoroid beam pattern. The beam pattern has no relation to range R, the intensity of each beam falling by a factor of $1/R^2$, while the intensity of the combined beams falls by a factor of $1/R^4$. The signal received by the monitor is attenuated with range by $-40 \log R$ decibels. As will be shown in conjunction with the discussion of the associated receiver circuitry, the amplitude of the received signal is never limited or clipped. Accordingly, the amplitude is indicative of the range of a detected intruder.

In the simplified scenic view set forth in FIG. 6, the volume of beam overlap, indicated by the dotted shading, marks that volume in which buoy 1 is most sensitive to amplitude and frequency variations of its ultrasonic signal caused by the movements of an intruder. In the remaining volumes, particularly in those immediately above, between, and below assemblies 2, 2', the buoy has no sensitivity, thereby eliminating the possibility of receiving a high amplitude signal in response to the movements of a small, but close fish. As the buoy can only be approached by a waterborne intruder through one of the regions in which the buoy is sensitive to amplitude and frequency variations, a water-borne intruder intent upon tampering with buoy 1 will be first detected. A depth sensitive mechanism such as a pressure diaphragm controlling a motor driven winch, may be employed to maintain buoy 1 at a fixed distance below the surface if float 70 is not used and intermediate member 48 is a buoyant gas filled chamber suspended by an anchor 60.

Figure 7A:
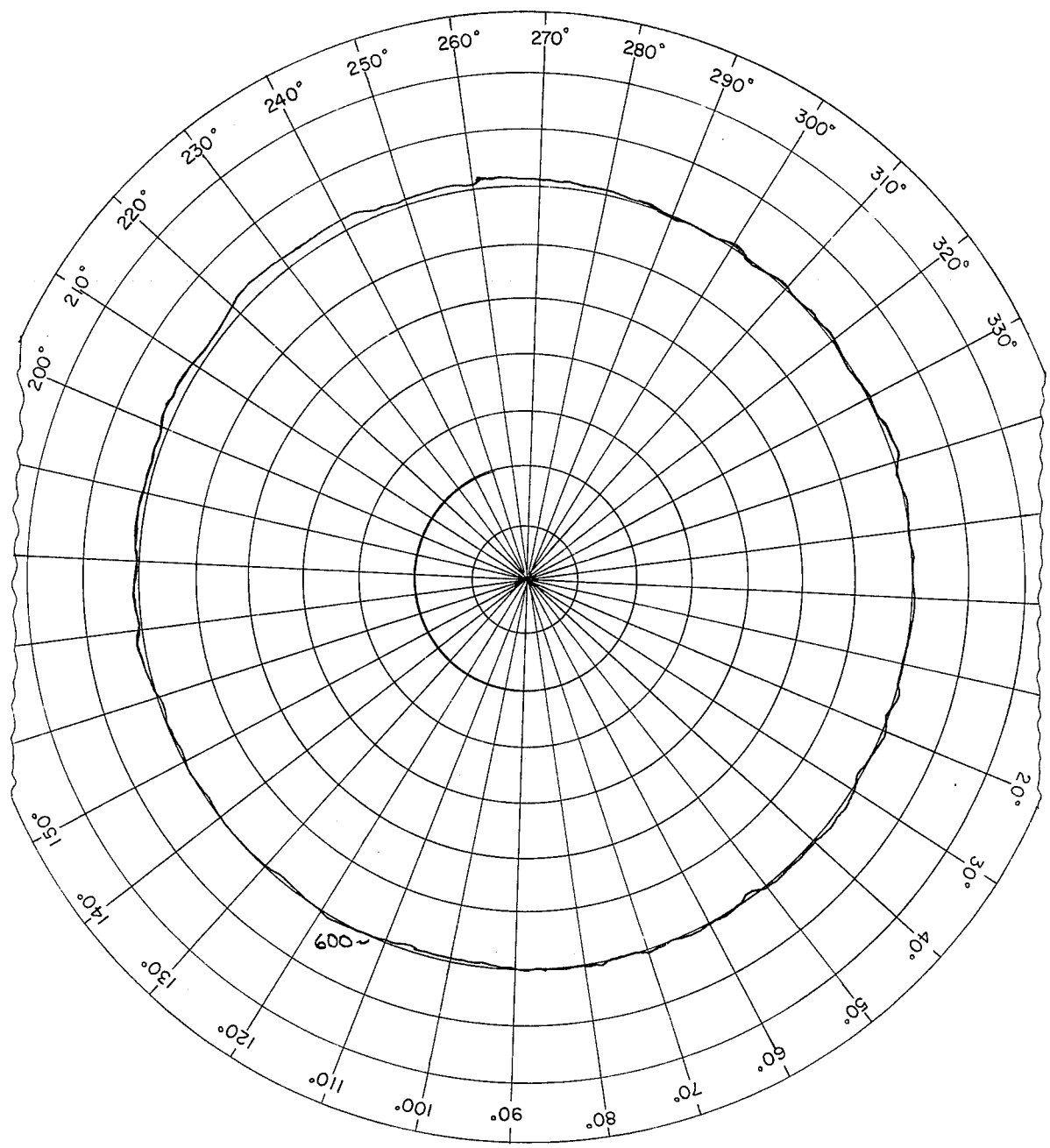
FIG. 7A is a horizontal beam pattern obtained with an intrusion monitor buoy of the type shown in FIG. 4.

FIG. 7A of the drawings is a polar coordinate graph of a typical buoy's horizontal beam in accordance with those techniques that are well known to those skilled in the art, and are disclosed in such standard references as

Figure 7B:
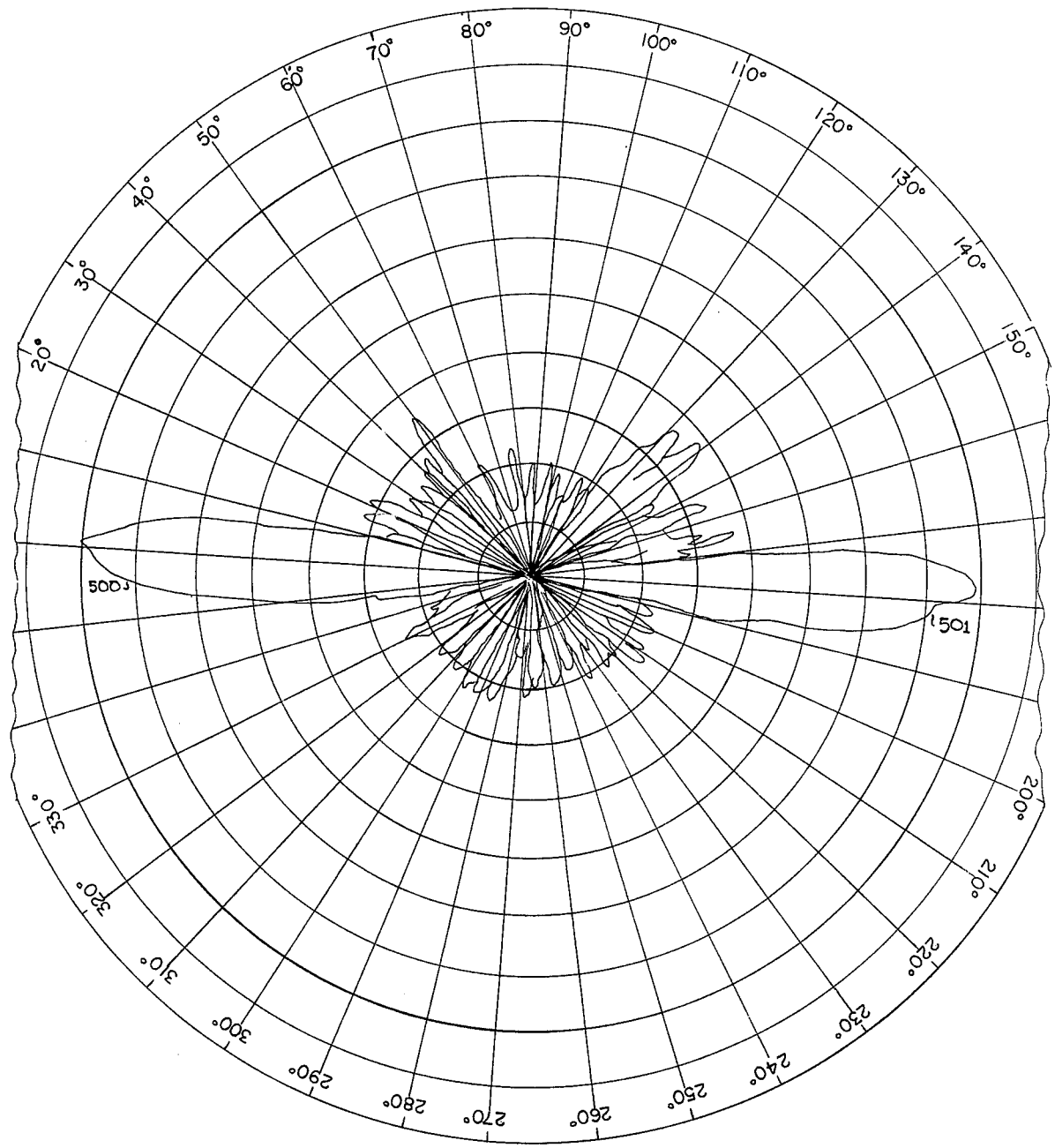
FIG. 7B is a vertical beam pattern obtained with an intrusion monitor buoy of the type shown in FIG. 4.

*Principles Of Underwater Sound For Engineers,* by R. J. Urick, Sec. 3.4, McGraw-Hill (1967). A buoy is deployed vertically at the center of the pattern. It might be noted that the pattern plotted will have a pronounced scalloped margin if the core or center void 11 of transducer element 10 is left hollow and a substantially uniform margin (i.e., as is shown in FIG. 7A) if the core 11 is filled with an insulating material such as potting compound used to encase the element. The blind volume of least sensitivity just above assembly 2 is not shown by the pattern plotted. FIG. 7B is a polar coordinate graph of a vertical beam pattern measured according to those techniques disclosed in such standard reference publications as *Principles Of Underwater Sound For Engineers, supra.* The beam width at three decibels down from the peak is approximately eight degrees.

In a copending U.S. application, Ser. No. 184,903, filed on Sept. 1971, by Arthur Delagrange, Wayne Wilson, and Cabell N. Pyror, Jr., there is taught an acoustic doppler detector circuit wherein an ultrasonic signal is transmitted and reflections are received, chopped and bandpass filtered. The resulting signals are amplified and fed into the headphones of the operator and into an audio circuit which provides alarm signals in response to the patterned cadence of a moving intruder. Referring now to FIG. 8 of the drawings where there is shown a block diagram similar to that set forth in FIG. 1 of Ser. No. 184,903, of the ancilliary circuits accompanying the transmitter and receiver transducer assemblies 2′, 2. An ultrasonic beam at the carrier frequency is projected by the transmitter assembly 2′ into the surrounding water. Reflected energy is picked up by the receiver transducer assembly 2 and amplified to a usable level by preamplifier 90. The preamplifier circuit 90 employs an automatic gain control to prevent overloading from strong returns which would otherwise spread the frequency spectrum of the reverberation noise. The automatic gain control is a modification of that disclosed in U.S. Pat. No. 3,904,971, Automatic Gain Control Amplifier Circuit, by A. D. Delagrange, as this circuit includes a crystal amplifier that necessitates two operational amplifier stages. The preamplifier circuit 90 also employs a band reject crystal X2 filter centered at the frequency of operation to reduce direct pick up from any adjacently deployed monitor buoy 1, mechanical shielding being infeasible. The amplified signal is demodulated (i.e., multiplied) at the transmitted frequency by the demodulator circuit 92. The signal provided by demodulator is proportional in frequency to the tangential velocity of any intruder 54. This demodulated signal is passed through a bandpass filter in order to eliminate spurious signals indicating an intruder propelled with a velocity either below a selected value or above an expected value. As the filtered signal is within the audio range, it is immediately amplified by headphone amplifier 94 for classification and identification by the operator. The filtered signal is also fed into the alarm amplifier circuit 95 and then alarm driver circuit 96 of the automatic alarm feature. The alarm driver circuit 96 uses both amplitude threshold and timing discrimination to minimize false alarms.

Figure 9:
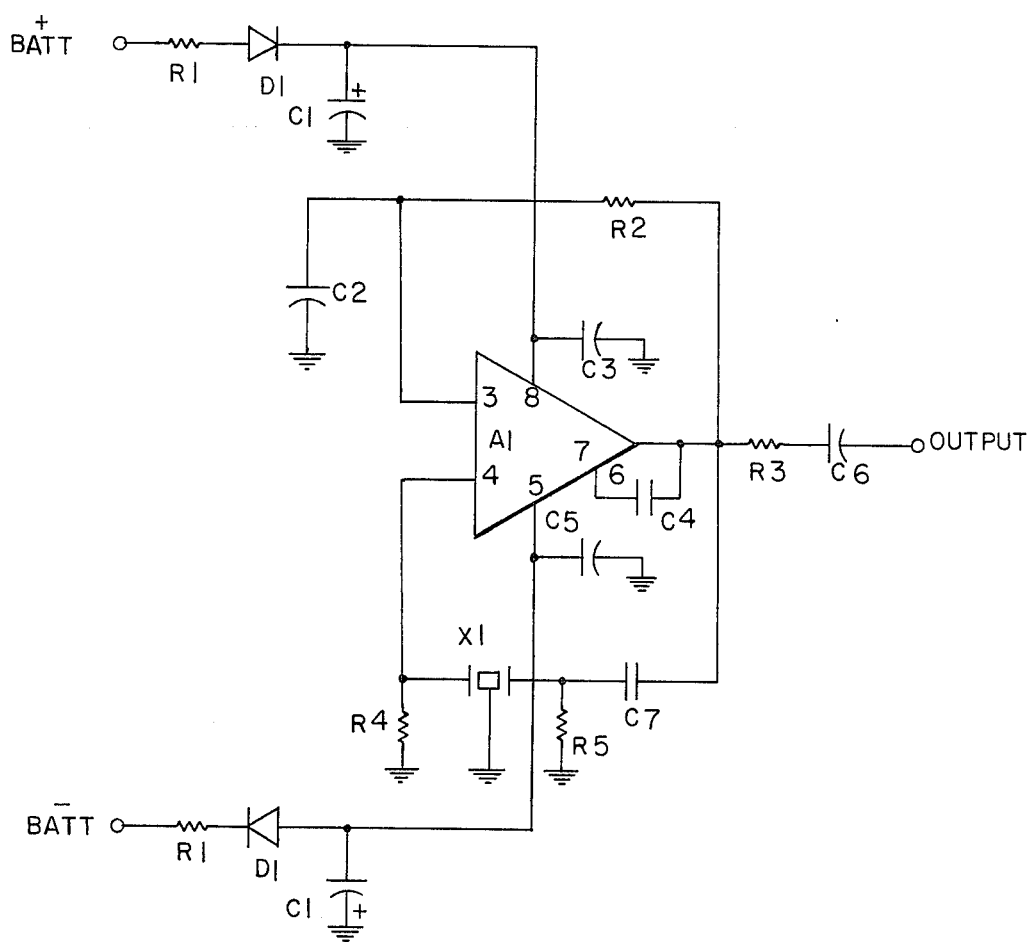
FIG. 9 is a schematic diagram showing an oscillator circuit.

FIG. 9 sets forth the details of the earlier described oscillator circuit 82. The oscillator uses an operational amplifier A1 with a crystal X1 in its positive feedback loop (i.e., between leads 6 and 4). At its resonant frequency, the crystal X1 appears as a lower impedance and the positive feedback loop again exceeds one with zero phase shift, thereby permitting the occurrence of oscillations. The R2–C2 components on the negative input (i.e., lead 3) biases operational amplifier A1 within its linear range so that it will not prevent oscillation by remaining in a saturated state when the power is first applied. Components R4, R5, and C7 correct the operation amplifier A1 phase lag to assure oscillation precisely at the center frequency of crystal X1. The amplifier's output signal swings between saturated states to provide a square wave. Components R3–C6 on the output terminal prevent damage to operational amplifier A1 in the event that the output terminal is accidentally grounded. R1–C1 on the positive and negative battery leads act as a low-pass filter to prevent signal transfer between the various circuits shown in FIG. 8 via their battery leads. Diodes D1 prevent circuit damage in the even the battery terminals are connected to voltages with a polarity opposite that intended. The diode D1 — resistor R1 are included in the battery leads for each of the circuits shown in FIG. 8 except that of transducer driver 80.

Figure 10:
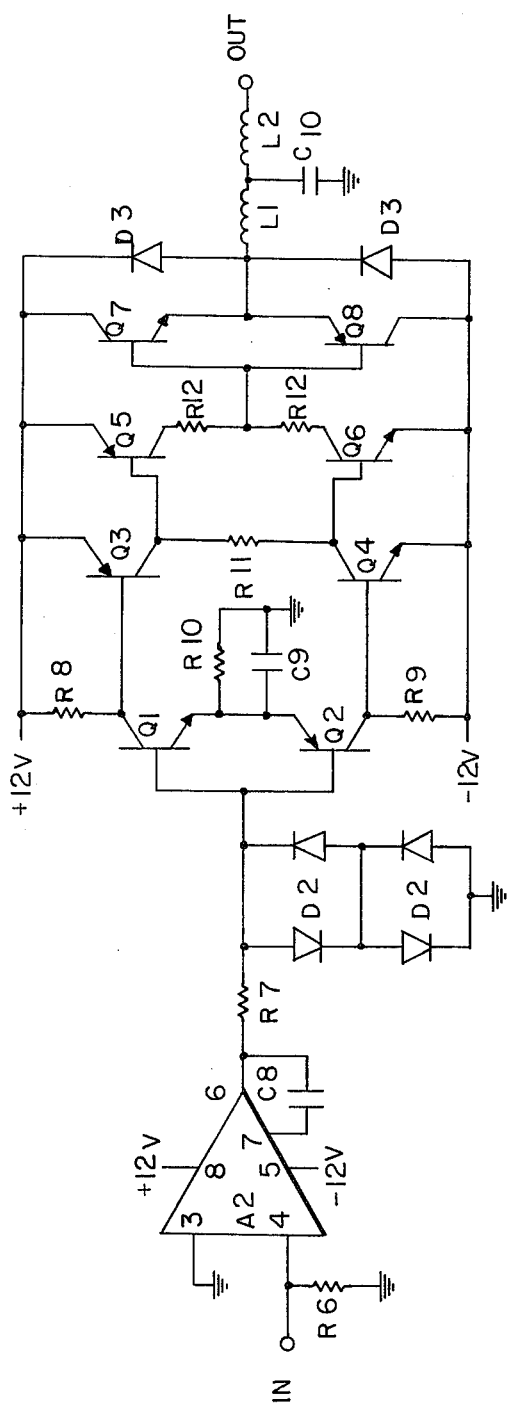
FIG. 10 is a schematic diagram showing a transmitter transducer driver circuit.
Figure 10:
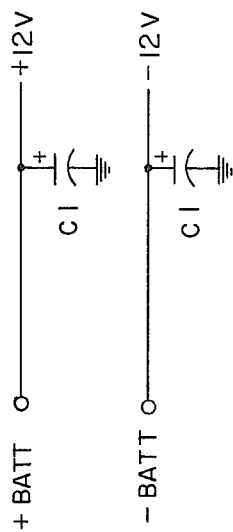

FIG. 10 sets forth transducer driver circuit 80. An operation amplifier A2 acts as an input buffer and drives a complementary level-shifter stage Q1–Q3. The next two complementary stages, Q3–Q4, Q5–Q6 increase current gain. The final or driver stage Q7–Q8 uses a complementary emitter-follower pair. A tuning circuit using a grounded shunt capacitor C10 following series inductor L1 provides filtering and voltage gain. As the transducer elements 10 are essentially capacitive by their nature, a coupling inductor L2 tunes the connected transmitter transducer assembly 2′. Diodes D3 to the power supplies handle the reverse current from the reactive load. The preamplifier circuit 90 shown in FIG. 1 utilizes two operational amplifiers A3, A4 for a gain. The automatic gain control loop reduces this gain upon reception of very strong echoes. If the output amplitude exceeds approximately 1 volts RMS, the average current through R23 and detecting diode D5 exceeds that flowing through R22, forcing the output of integrator A5 to a positive value. When the output voltage of integrator A5 reaches the pinchoff voltage of field-effect transistor Q9, the resistance decreases, thereby loading transducer element 10 and reducing the amplitude of the amplified echo to 1 volt RMS at the output terminal. The automatic-gain-controls time constant is approximately ten milliseconds.

The crystal X2 coupling the two stages has the same resonant frequency as crystal X1. Crystal X2 serves as a band reject filter at the carrier frequency, thereby reducing the gain of preamplifier circuit 90 by about twenty decibels at the carrier frequency. This reduces the dynamic range necessary to handle the relatively large direct pickup component in the echo caused by the presence of other monitor buoys 1 deployed nearby. Reduction of dynamic range places a close tolerance on the crystal frequency because the bandwidth of the crystal X2 filter is rather small. A ± 0.0025% tolerance is readily obtainable and is adequate.

The diode D6 across the integrator A5 prevents the integrator circuit from overdriving transistor Q9. The capacitor C13 between the integrator A5 and ground potential prevents without disturbing the AGC time constant an input signal leak from affecting the performance of integrator A5. The back-to-back diodes D4 at the input terminal of operational amplifier A3 clamp large input signals thereby preventing transient signals from damaging the amplifier A3. The resistor R17 coupling the output of operational amplifier A3 to a −12 volts converts its operation from an otherwise class B to a class A, thereby reducing distortion.

Figure 12:
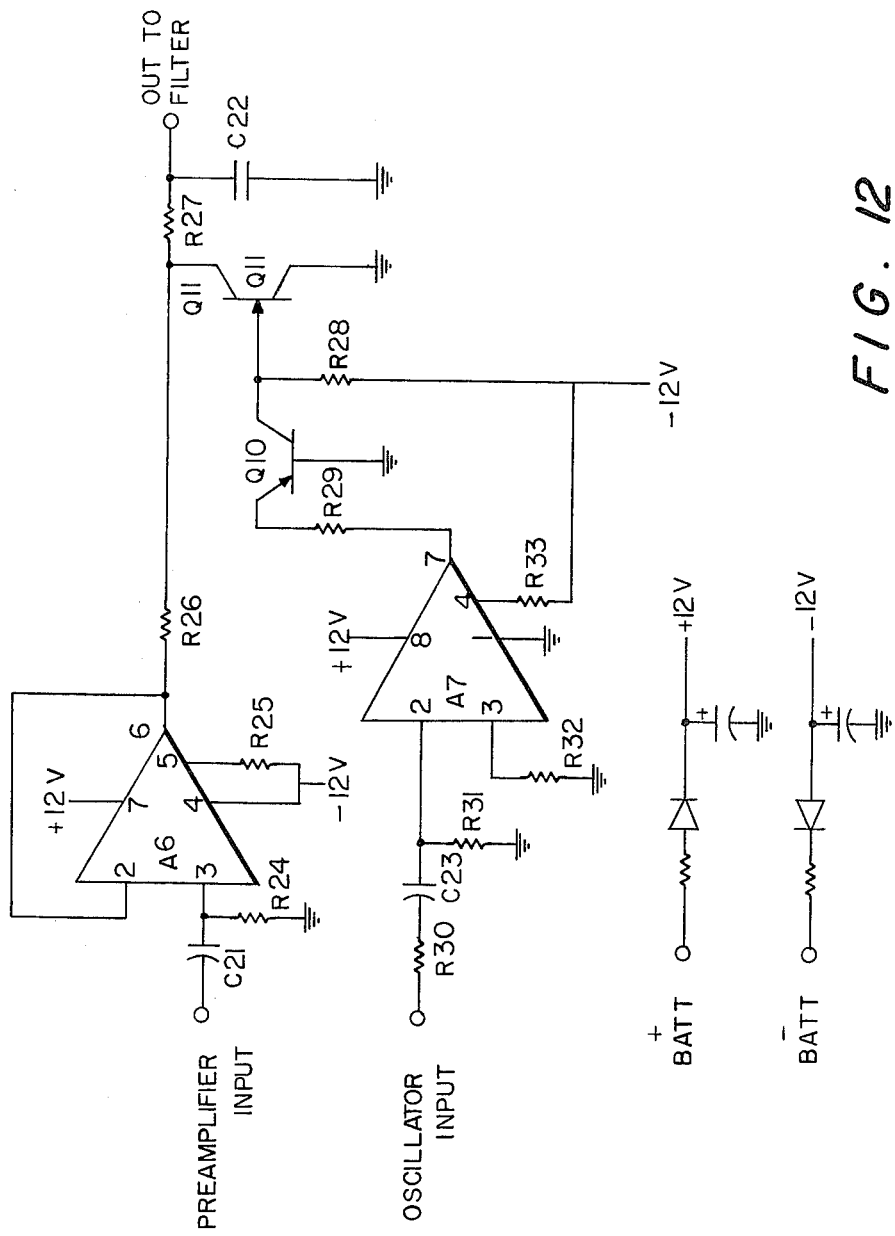
FIG. 12 is a schematic diagram showing a demodulator circuit.

FIG. 12 shows the schematic of the demodulator circuit 92 which multiplies the received echo frequency by the transmitted frequency. The product is equivalent to the "sum" and "difference" of these frequencies. The "sum" or "double" is not of interest in operation of the monitor buoy, and is immediately filtered out. The "difference" or "baseband" frequency is a zero frequency (i.e., direct current) if the received echo frequency equals the transmitted frequency, and is also filtered out. If the transmitted signal has been modulated by the pattered cadence of the propulsion movements of an intruder, the baseband frequency spectrum is spread over a finite frequency band and is retained. A unity-gain follower A6 acts as a buffer amplifier for the output of the preamplifier 90. A clipper amplifier A7 squares the oscillator 82 signal and drives a field-effect transistor Q10 which acts as a chopper by switching the received signal on and off. The chopper may be replaced by a linear multiplier although the latter is considerably more complicated. The chopper circuit creates additional high frequency products, but these are filtered to ground.

Figure 13:
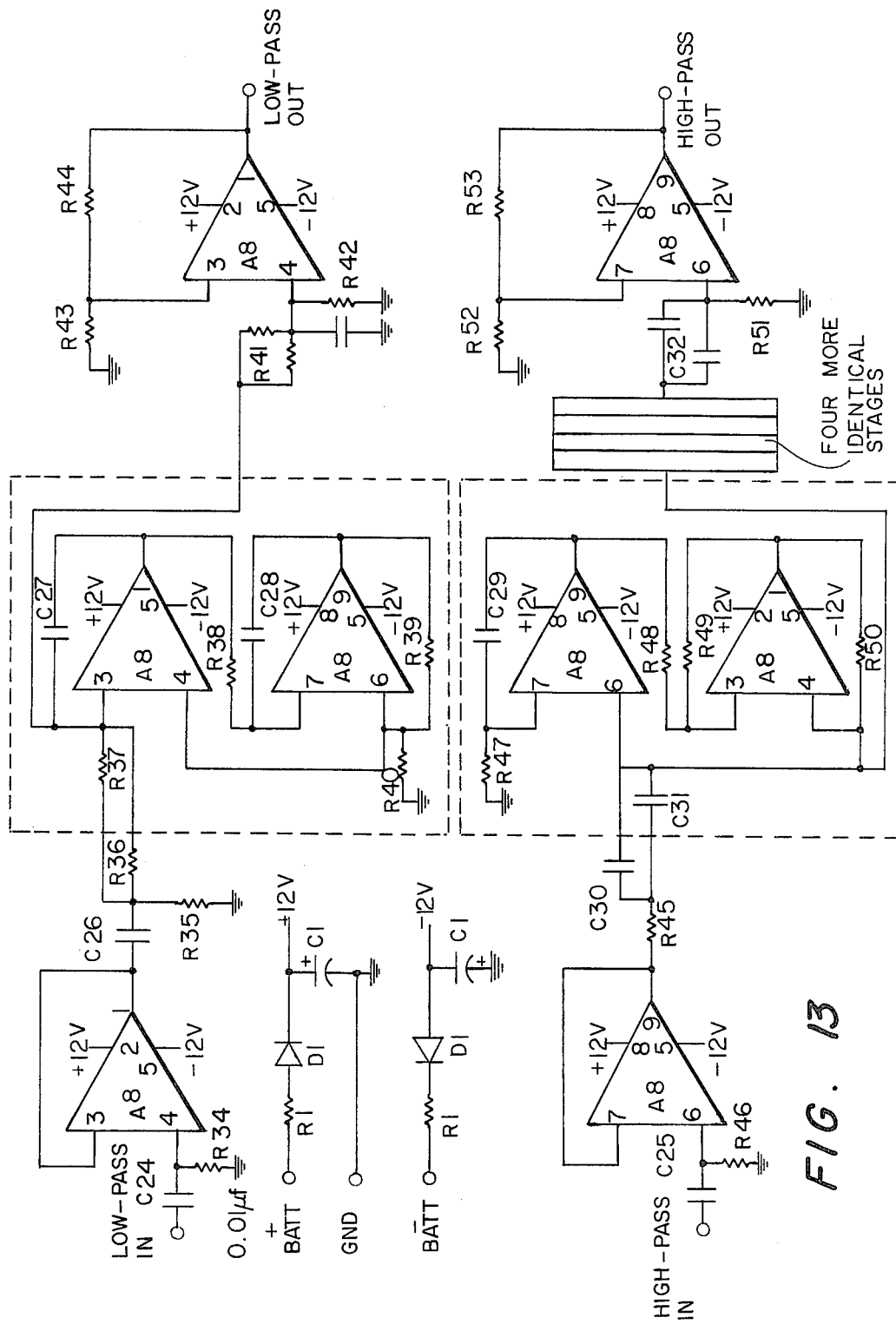
FIG. 13 is a schematic diagram showing a bandpass filter.

FIG. 13 shows the schematic of bandpass filter 93, a low-pass section followed by a high-pass section. The high pass section is an eleven pole filter giving a very steep skirt. As this extreme steepness is not required at the high frequencies, a three-pole filter is used in the low-pass section. The low-pass section is a ladder formed by series resistors and a shunt "super-capacitor," terminated on both ends by capacitors. Super-capacitors are also referred to as "D" elements or frequency-dependent-negative resistors as their impedance is negative-real and is proportional to the reciprocal of the frequency squared. The high-pass section is a ladder of series capacitors and shunt synthetic inductors, terminated on both ends by resistors.

Figure 14:
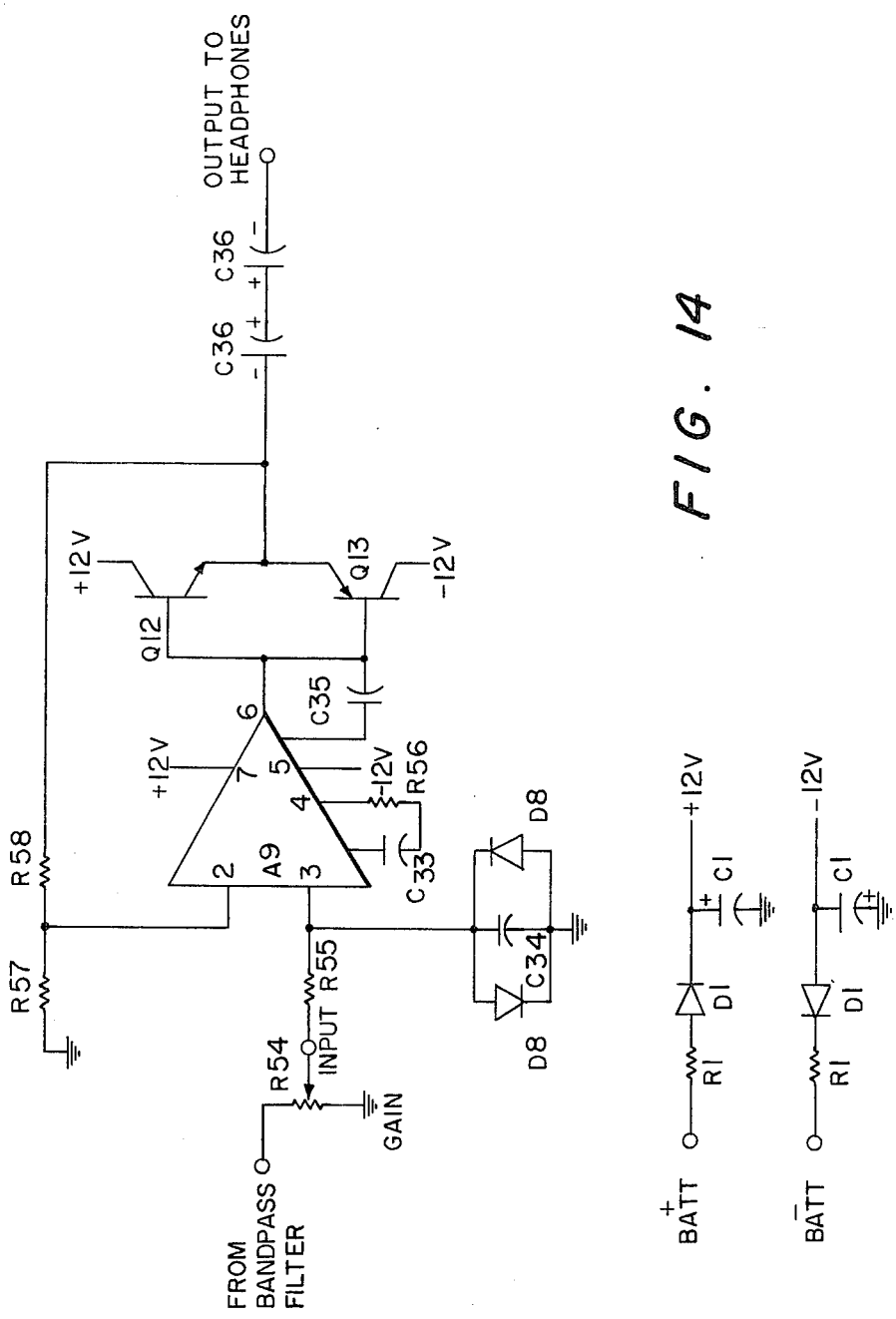
FIG. 14 is a schematic diagram showing a headphone amplifier circuit.

FIG. 14 shows the schematic of the headphone amplifier circuit, an operational amplifier A9 connected for a fixed gain of ten (i.e., 20 decibels). A potentiometer R54 controls the volume of the headset. A pair of complementary emitter-followers Q12, Q13 increase the current drive capability of operational amplifier A9. The output signal is "AC" coupled by capacitors C36, C37 in order to protect the transistors in the event of an accidental short circuit at the output terminal.

Figure 15:
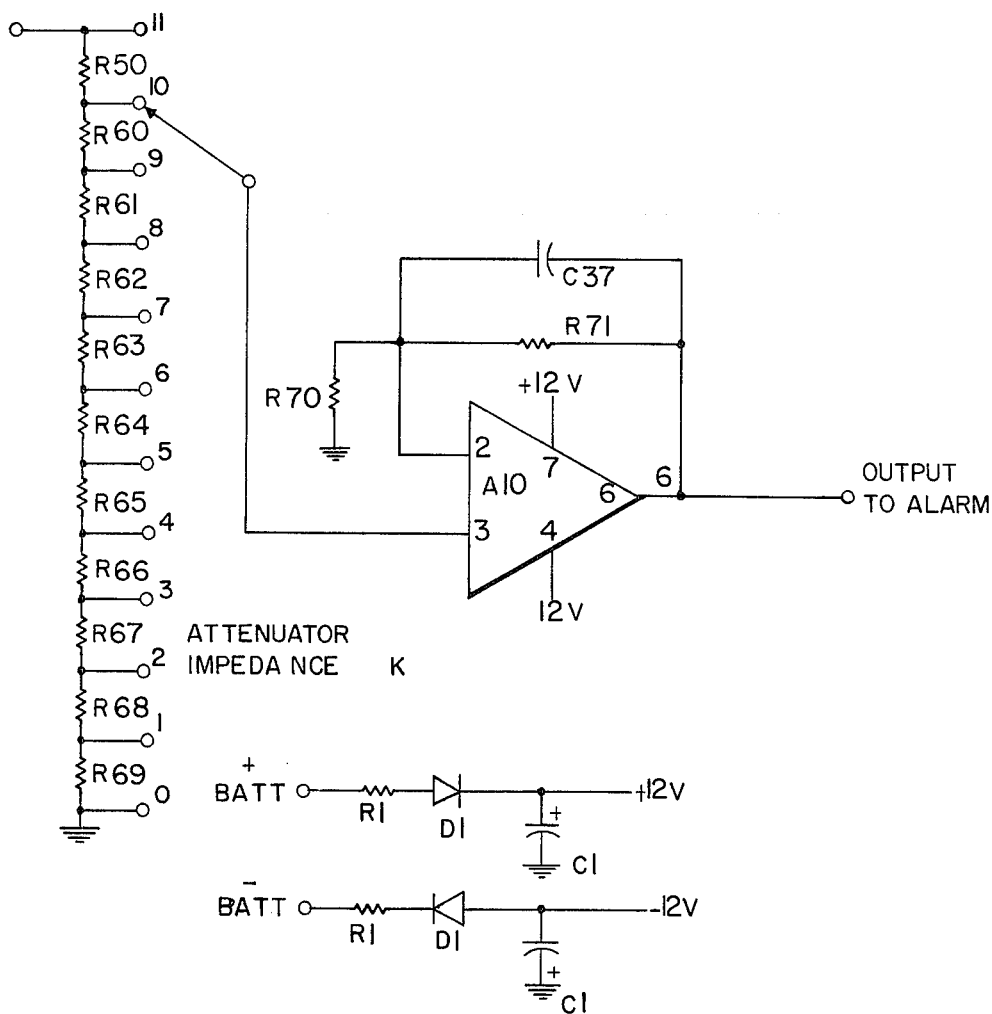
FIG. 15 is a schematic diagram showing an alarm amplifier circuit.

FIG. 15 shows the schematic of the alarm amplifier 95 which utilizes an operational amplifier A10 for gain. A capacitor C37 is connected across feedback resistor R71 in order to roll-off the high frequency gain, thereby minimizing noise. An attenuator R59-R69 controls the alarm sensitivity by reducing gain.

Figure 16:
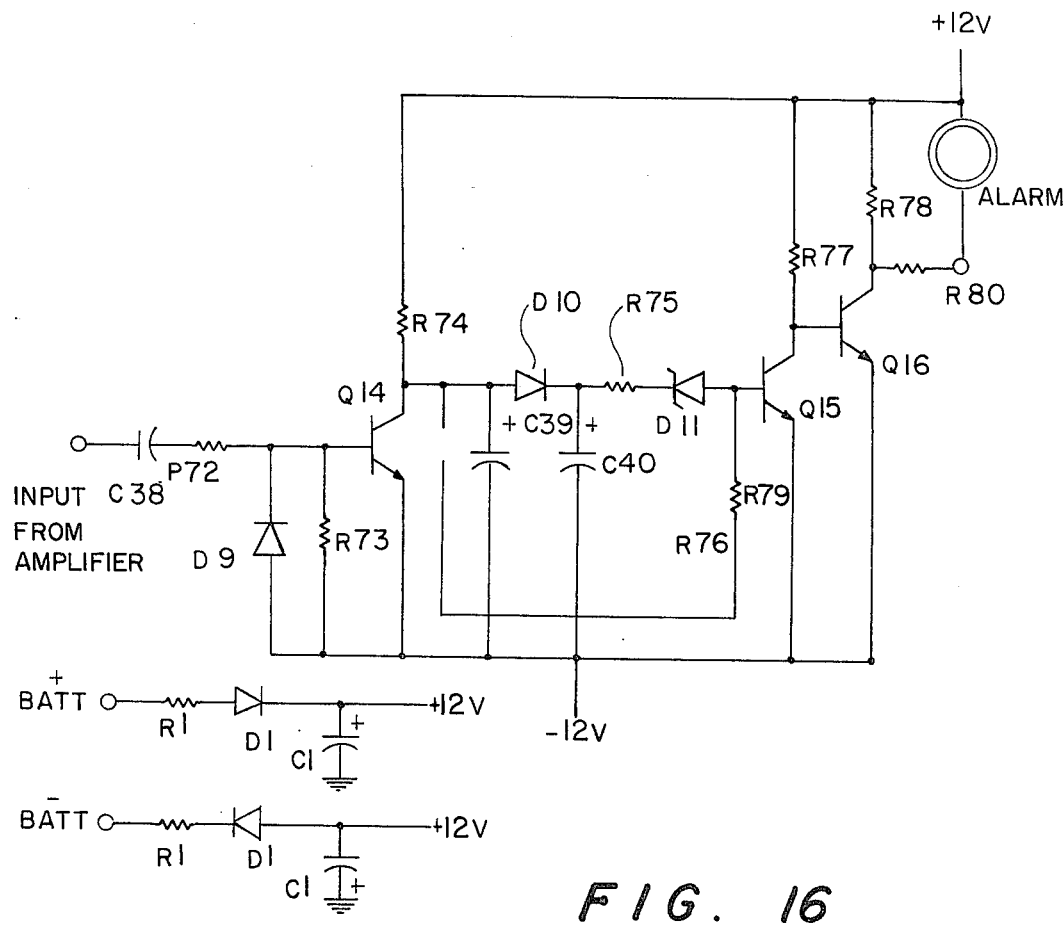
FIG. 16 is a schematic diagram showing an alarm driver circuit.

FIG. 16 shows the schematic of the circuit of alarm driver 96. The alarm driver senses the peak amplitude present in the filter band. If the voltage of the detector filter exceeds the threshold determined by the attenuation setting, the circuit pauses for a first selected interval and then gives a trigger pulse if another threshold crossing occurs within a succeeding interval. Thus, while a single short transient will not trigger the alarm, two movements or one extended movement will. This feature greatly reduces the false alarm rate.

The alarm driver circuit operates as follows: a voltage peak greater than the transistor threshold voltage at its input will cause the transistor Q14 to conduct, discharging the first capacitor C38. The second capacitor C39 begins to discharge, but its stored voltage holds the second transistor Q15 on for 1 sec while the first capacitors C38 begins to charge again. Then if another large input signal occurs the first transistor Q14 saturates again. There is then no base current for the second transistor Q15 and it turns off. The output transistor turns on Q16 and sounds the alarm. If no second signal occurs within 5 sec the first capacitor C38 will have recharged and the diode D10 will conduct, recharging the second capacitor C39. The circuit is then reset, and again waits for a pair of signals. The diode D9 at the input protects the input transistor against excessive reverse base voltage. The alarm emits an audible tone when a DC voltage is applied.

Although the transducer element 10, 10' is described as a hollow, right circular cylinder of a piezoelectric material, it may have a variety of shapes, and may also be fabricated from a magnetostrictive material. It is understood that the shape and dimensions of the transducer assembly influences the beam pattern. The circular grounding plates can be fabricated with brass, aluminum or stainless steel. If aluminum is used, it should be anodized and coated to withstand attack by the sea water. The grounding plates are mainly used as electrical conductors, but also provide rigidity to the assembly.

From the foregoing discussion, it will be apparent that the invention has broad application in the fields of underwater monitoring and detecting devices and apparatus. For example, a plurality of monitor buoys each having a transmitter and a receiver assembly could be deployed in a selected arrangement with barely overlapping beam patterns in order to protect a wider area than that allowed by the range limitations of a single monitor buoy. In an alternative arrangement of the foregoing example, alternate monitor buoys may be equipped with only a receiver transducer assembly. This allows for an increased range through an increase in the allowed sensitivity of the receiver transducer assemblies as the absence of alternate transmitter transducer assemblies means a concomitant absence of a source of crosstalk between assemblies. In another situation a plurality of receiver assemblies are individually deployed below the water's surface around a single transmitter assembly to provide overlapping and therefore more uniform volumes of coverage. Alternate transmitter and receiver assemblies may be individually deployed in a line or in a patterned array to provide coverage for a particular volume such as a shoreline, the entrance to a harbor, or the hull of a vessel. The latter arrangement of individually deployed transmitting and receiving transducer assemblies (e.g., deployment of a string buoys spaced apart by a fixed distance with every other buoy having a single transducer assembly connected to a transmitter circuit and with intermediate buoys having a single transducer assembly connected to a corresponding receiver circuit), allows less crosstalk between the transmitting and receiving transducer assemblies, thereby providing greater sensitivity to detectin of intruders. While prior art Doppler systems will indicate a small target close to the transducer assembly with a signal having the same amplitude as a signal indicating a large but more distant target, the presently disclosed system will be less apt to indicate detection of a small target (e.g., a small fish) thereby improving the false alarm rate. In another deployment array, several receiver transducer buoys may be deployed around each transmitter transducer buoy in order to provide additional coverage and bearing information about a detected intruder.

The laminae of sound absorbing material covering the surfaces of the grounding plates should have twenty to thirty pounds per inch of absorption at the operating frequency, a high sound velocity at the operating temperature and pressure, and a low water absorption coefficient. In addition, the material should easily bond to metals such as brass or aluminum. A suitable sound absorbing material, a butyl rubber manufactured by the B. F. Goodrich Aerospace And Defense Products Division, Akron, Ohio, has a tensile strength of 2900 pounds per square inch, a modulus of elasticity of 100 pounds per square inch, a Shore-A hardness of 40 durometers, and a water absorption coefficient of 0.1. Its sound velocity (which determines the absorption coefficient) is 1600 meters per second at 35° Celsius and 1900 meters per second at 10° Celsius. Sound absorption is the highest in the "Rho-C" class of butyl rubbers, at 30 pounds per inch at 425 kilo-Hertz and at 7 pounds per inch at 107 kilo-Hertz.

It will be considered, therefore, that all those changes and modifications which fall fairly within the scope of the invention shall be a part of the invention.

What is claimed and desired to be secured by Letters Patent of the U.S. is:

1. In an immersible acoustic doppler monitor system for detection of the patterned cadence propulsive movements of a distant object in the surrounding fluid, a transducer assembly comprising:
   An active right circular cylindrical transducer element having a coaxial right circular cylindrical cavity extending between opposite bases;
   an electrically conductive coating on the cylindrical surfaces of said element;
   a resilient electrically insulative material encasing said element; and,
   a first pair of elastic disks of a sound absorbent material, each coaxially disposed on opposite bases of said encased element, and each having a diameter in excess of said encased element.

2. The transducer assembly set forth in claim 1 further comprising a pair of electrically conducting disks each coaxially disposed adjoining a different one of said elastic disks.

3. The transducer assembly set forth in claim 2 further comprising a second pair of elastic disks each coaxially disposed adjoining a different one of said elastic disks.

4. The transducer assembly set forth in claim 3 wherein said first and said second pairs of elastic disks are comprised of butyl rubber.

5. An immersible acoustic doppler monitor system having a field pattern with a conoid primary lobe for providing an alarm system in response to detection of patterned cadence propulsive movements of a distant object in the surrounding fluid, comprising:
   a first and a second coaxially spaced-apart and acoustically isolated transducer assembly each comprised of:
   a right circular cylindrical transducer element having a coaxial right circular cavity extending between opposite bases;
   an electrically conductive coat covering the cylindrical surfaces of said element; and,
   a pair of disks each having a circumference bounding an edge of the the primary lobe, each being formed of a center layer of an electrically conducting material covered on each face with an electrically insulating, elastic material, each disk symmetrically disposed in parallel planes about a different base of said element;
   intermediate means for retensive holding each of said transducer assemblies coaxially spaced apart in acoustic isolation while immersed;
   transmitter means electrically coupled across radially opposite surfaces of said element of said first assembly and adapted to provide an electrical signal having a selected acoustic frequency;
   receiver means electrically coupled across radially opposite surfaces of said element of said second assembly and adapted to provide an electrical alarm signal in response to a pressure variation at the surface of said encased second element; and,
   a pair of electrically conductive means each for coupling a different pair of said electrically conducting center layers to a remote ground potential.

6. The system set forth in claim 5 wherein the field pattern has a vertical beam width of 8° at three decibels down from the peak.

7. A transducer having a field pattern characterized by a conoid primary lobe, comprising:
   a cylindrical transducer element with a coaxially cylindrical cavity extending through opposite bases;
   electrically conductive means covering the cylindrical surfaces of the element;
   an acoustic coupling encasing the element; and,
   a pair of layers of sound absorbent material coaxially disposed about the opposite bases, the perimeter of each layer defining the primary lobe.

8. The transducer set forth in claim 7 further comprising a pair of ground planes parallel to, and separated by, the pair of layers.

9. The transducer set forth in claim 7 further comprised of the cavity filled with a material having acoustic properties substantially equal to those of the coupling.

10. The transducer set forth in claim 7 wherein the element is active.

11. The transducer set forth in claim 7 wherein the element is passive.

12. A transducer having a field pattern characterized by a conoid primary lobe in the surrounding medium, comprising:
   a cylindrical transducer element having a coaxially cylindrical cavity extending through opposite bases;
   an electrically conductive coating covering the cylindrical surfaces of the element;
   a resilient and electrically insulating material uniformly encasing the element; and,
   a first pair of disks of a sound absorbent material coaxially positioned in parallel planes at the opposite bases, each circumferentially extending into a null adjacent the primary lobe.

13. The transducer set forth in claim 12 further comprised of each of the first pair of disks extending circumferentially to the edge of the primary lobe.

14. A continuous-wave, doppler sonar system using a first and a second transducer constructed according to the limitations set forth in claim 12, comprised of:
   a tensile member interposed between the first and the second transducer whereby the disks of the first are substantially parallel to the disks of the second;

a plurality electrically conductive plates, each embedded in a different one of the disks, and each having sufficient area to electrically shade the first and the second transducer from the farther of the first and second transducer;

transmitter means electrically coupled across radially opposite surfaces of the element of the first transducer and adapted to provide an electrical signal having a selected acoustic frequency;

receiver means electrically coupled across radially opposite surfaces of the element of the second transducer and adapted to provide an electrical alarm signal in response to a pressure variation at the surface of the second element; and, a par of electrically conductive means each for coupling a different pair of the electrically conductive plates to a ground potential.

15. A continuous-wave, doppler sonar system using a first and a second transducer constructed according to the limitations set forth in claim 12, comprised of:

a tensile member coaxially interposed between the first and the second transducer whereby disks of the first are substantially parallel to the disks of the second;

a first and a second electrically conductive circular plate, each plate embedded in one of the disks nearest the tensile member, whereby each plate electrically shades the nearer element of the first and second transducer from the farther of the first and second transducer;

the first transducer being active;

the second transducer being passive; and, means for coupling the electrically conductive plates to a ground potential.

16. The transducer set forth in claim 12 further comprised of a pair of electrically conducting circular surfaces each symmetrically disposed in parallel planes to, and separated by opposite layers from, the opposite bases.

17. The transducer set forth in claim 16 further comprised of the conducting surfaces coupled to a ground potential.

18. The transducer set forth in claim 16 further comprised of the cylindrical cavity filled with the insulating material.

19. The transducer set forth in claim 12 further comprising a pair of circular ground planes parallel to, but separated by, the first pair of disks.

20. A continuous-wave, doppler sonar system using a first and the second transducer constructed according to the limitation set forth in claim 19, comprised of:

a tensile member coaxially interposed between the first and the second transducer whereby the ground planes of the first are substantially parallel to the ground planes of the second;

transmitter means electrically coupled across radially opposite surfaces of the element of the first transducer and adapted to provide an electrical signal having a selected acoustic frequency; and, receiver means electrically coupled across radially opposite surfaces of the element of the second transducer and adapted to provide an electrical alarm signal in response to a pressure variation at the surface of the second element.

21. A transducer for creating an omnidirectional field pattern in a surrounding medium having a major lobe, comprising:

a right circular cylindrical transducer element having a coaxial right circular cylindrical cavity extending between opposite bases;

an electrically conductive coating covering the cylindrical surfaces of the element;

a resilient and electrically insulating material encasing the element; and, a first pair of elastic disks each coaxially disposed in parallel planes about the opposite bases, and each disk having a radius substantially equal to the radial distance between the axis of the element and an edge of the major lobe.

22. The transducer set forth in claim 21 further comprised of a pair of electrically conductive disks symmetrically disposed in parallel planes on opposite of the elastic disks.

23. The transducer set forth in claim 21 further comprised of the conductive disks maintained at ground potential.

24. The transducer set forth in claim 21 further comprised of a pair of electrically conductive disks coaxially embedded in parallel planes in opposite of the elastic disks.

25. The transducer set forth in claim 24 further comprised of the conductive disks electrically coupled to a ground potential.

26. The transducer set forth in claim 21 further comprised of the cavity being filled with the resilient material.

27. A transducer for creating in a surrounding medium an omnidirectional field pattern having a primary lobe, comprising:

a cylindrical transducer element having a coaxially cylindrical cavity extending through opposite bases;

an electrically conductive coating covering the surfaces of the element;

a resilient and electrically insulating material encasing the element; and, a first pair of disks of a sound absorbent material coaxially positioned at the opposite bases, each circumferentially extending to an edge of the primary lobe.

28. The transducer set forth in claim 27, further comprising a pair of coaxially opposite ground planes disposed about, and separated by opposite disks from, the opposite bases.

29. The transducer set forth in claim 27 further comprising the insulating material filling the cylindrical cavity.

30. The transducer set forth in claim 27, further comprising a pair of coaxially opposite ground planes disposed about, and separated by, opposite disks from the opposite bases.

31. The transducer set forth in claim 27, further comprising a pair of ground planes parallel to, but separated by, the first pair of disks.

* * * * *